United States Patent Office 3,474,462
Patented Oct. 21, 1969

3,474,462
NITROFURYL OXADIAZOLONES
Hermann Breuer, Regensburg, Germany, assignor to
E. R. Squibb & Sons, Inc., New York, N.Y., a
corporation of Delaware
No Drawing. Filed Jan. 24, 1967, Ser. No. 611,239
Claims priority, application Germany, July 22, 1966,
C 39,685, C 39,686
Int. Cl. C07d 85/52, 5/16; A61k 21/00
U.S. Cl. 260—240                         10 Claims

ABSTRACT OF THE DISCLOSURE

This invention relates to new, improved antimicrobial agents of the formula (I)
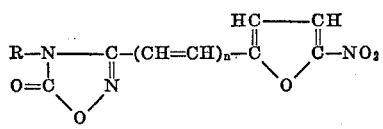

wherein R is hydrogen, alkyl, aralkyl, hydroxyalkyl, haloalkyl or acyl and $n$ is 0, 1 or 2 as well as alkali metal, alkaline earth metal and amine salts of those compounds wherein R is hydrogen.

In particular, this invention pertains to new compounds of Formula I above wherein R is hydrogen, lower alkyl groups both straight and branched chain in structure such as methyl, ethyl, propyl, isopropyl, butyl, t-butyl, amyl and the like; hydroxy-lower alkyl groups of the same type such as 2-hydroxyethyl, 3-hydroxypropyl and the like; similar halo-lower alkyl groups such chloromethyl, bromomethyl, bromoethyl, chloropropyl and the like; phenyl-lower alkyl groups having the same kind of alkyl group and acyl groups such as lower alkanoyl, e.g., acetyl, propionyl, etc., benzoyl and phenyl-lower alkanoyl, e.g., phenacetyl.

The compounds of this invention show particular advantages over other known nitrofuran derivatives. These compounds are useful as antimicrobial agents to combat animal infections due to bacteria and fungi such as Staphlyococci, Escherichia, Klebsiella, Candida and Trichophyton, and particularly effective against infections caused by Trichomonas organisms such as *T. vaginalis* and *T. foetus*. They may be used orally in the conventional oral dosage forms in a range of about 10 mg. to 200 mg. per kilogram per day or topically in a cream or ointment vehicle at a concentration of about 0.05 to 2.0%. Especially preferred are those compounds in which there is a single vinyl group ($n=1$).

The compounds of Formula I wherein R is hydrogen have the additional advantage of forming alkali and amine salts which are water soluble and neutral in reaction as well as stable in aqueous solution. These may also be used parenterally.

The compounds of this invention may be produced by several methods. One alternative is nitrating, e.g., with nitric acid, a compound of the formula (II)
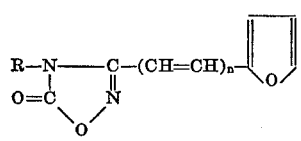

wherein R and $n$ have the same meaning as above.

The nitrated product, when R is hydrogen, may then be converted to an alkali salt, e.g., by treatment with an alkali metal or alkaline earth metal compound, or to an amine salt, e.g., by treatment with a basic amine such as ethanolamine or the like.

The alkali salts may be alkylated or acylated, e.g., by treatment with dialkyl sulfates, alkylhalides, hydroxyalkyl halides, haloalkylhalides, acid anhydrides, acid halides or the like, to introduce the various substituents, other than hydrogen, represented by the symbol R in Formula I. Formation of the alkali salt is optional when acylating with an acid anhydride.

As an alternative, a compound of the formula (III)
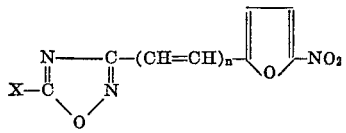

wherein $n$ is the same as above and X represents a group which is readily converted to a hydroxy group, e.g., trichloromethyl, may be treated with alkali, e.g., sodium hydroxide to obtain a compound of Formula I wherein R is hydrogen.

The following examples are illustrative of the invention. Temperatures are on the centigrade scale.

Example 1

100 grams of 3-(2-furyl)-1,2,4-oxadiazol-5-one are dissolved in 330 ml. of concentrated sulfuric acid. 50 grams of nitric acid ($d=1.52$) are then added dropwise at a temperature of $-50°$. The clear viscous solution is stirred for 15 minutes and then poured over ice with stirring. This is filtered under suction and the precipitate is washed with water. The still damp filtered 3-(5-nitro-2-furyl)-1,2,4-oxadiazol-5-one (M.P. 171–172° after crystallization from water) is stirred in 400 ml. of water and 2 N sodium hydroxide is added to the suspension until pH 8 is reached. At this point almost everything is in solution. Finally the sodium salt of 3-(5-nitro-2-furyl)-1,2,4-oxadiazol-5-one crystallizes. This is permitted to stand overnight in the refrigerator, then filtered under suction and washed with a little water. The yield is 103.9 grams, M.P. 204°, with dec.

Example 2

10 grams of 3-β-(5-nitro-2-furyl)vinyl-5-trichloromethyl-1,2,4-oxadiazole and suspended in 30 ml. of dimethylformamide. 25 ml. of 2 N sodium hydroxide solution are added dropwise at 20° with cooling. The substance thereupon goes into solution. This is diluted with a little water and sodium hydroxide solution is added until the solution is at pH 8. This is filtered and acidified with dilute hydrochloric acid. The mixture is filtered under suction and the still moist crude product is brought into solution. The solution is treated with active carbon, filtered and the filtrate is then acidified with 2 N hydrochloric acid. The precipitate is filtered under suction and washed with water. There are obtained 6.6 grams of 3-β-(5-nitro-2-furyl) vinyl-1,2,4-oxadiazol-5-one, M.P. 205° with dec.

Example 3

3 grams of 3-(2-furyl)-4-methyl-1,2,4-oxadiazol-5-one are dissolved in 10 ml. of concentrated sulfuric acid. 1.5 grams of nitric acid ($d=1.52$) are added dropwise at 0°. The mixture is stirred for 30 minutes at 0° and then poured into water. The crystals which separate are filtered under suction to obtain 2.7 grams of 3-(5-nitro-2-furyl)-4-methyl-1,2,4-oxadiazol-5-one, M.P. 113–115°.

Example 4

2.4 grams of the sodium salt of 3-[β-(5-nitro-2-furyl) vinyl]-1,2,4-oxadiazol-5-one are dissolved in 20 ml. of dimethylformamide. While the solution is stirred at room temperature, 1.5 grams of dimethylsulfate are added dropwise. After stirring for 30 minutes additional, the mixture is diluted with water and dilute sodium hydroxide solution is added until pH 8. The precipitate is then filtered under suction to obtain 2 grams of 3-[β-(5-nitro-2-furyl)vinyl]-4-methyl-1,2,4-oxadiazol-5-one, M.P. 170–173°.

Example 5

By following the procedure of Example 2, but substituting ethyl iodide for the dimethyl sulfate, warming the mixture for two hours at 50° and then keeping it overnight at room temperature, there is obtained 3-[β-(5-nitro - 2 - furyl)vinyl]-4-ethyl-1,2,4-oxadiazol - 5 - one, M.P. 145–147°.

Example 6

1.2 grams of the sodium salt of 3-[β-(5-nitro-2-furyl)vinyl]-1,2,4-oxadiazol-5-one are dissolved in 120 ml. of dimethylformamide. 6 ml. of benzyl chloride are added and the reaction mixture is heated for 90 minutes in a boiling water bath. This is diluted with 400 ml. of water, adjusted to pH 8 with 2 N sodium hydroxide solution and the precipitated crystals are filtered under suction. These are recrystallized from 40 ml. of acetone to obtain 6 grams of 3-[β-(5-nitro-2-furyl)vinyl]-4-benzyl-1,2,4-oxadiazol-5-one, M.P. 150–152°.

Example 7

15 grams of the sodium salt of 3-[β-(5-nitro-2-furyl)vinyl]-1,2,4-oxadiazol-5-one are dissolved in 100 ml. of distilled dimethylformamide. 0.5 gram of potassium iodide and 38 grams of ethylenebromohydrin are added to the solution which is first heated for two hours at 50° and then for two hours in a boiling water bath. The reaction solution is poured into 750 ml. of water. The solution is adjusted to pH 8 with 2 N sodium hydroxide solution. There are obtained 10 grams of 3-[β-(5-nitro-2 - furyl)vinyl] - 4 - (β - hydroxyethyl) - 1,2,4 - oxadiazol-5-one, which, after recrystallization from dioxane, melts at 172–174°.

Example 8

15 grams of the sodium salt of 3-(5-nitro-2-furyl)-1,2,4-oxadiazol-5-one are dissolved in 100 ml. of distilled dimethylformamide. 17 grams of benzyl chloride are added and the reaction mixture is heated for two hours in a boiling water bath. Most of the dimethylformamide is distilled off and water is added to the residue. There are obtained 14.7 grams of 3-(5-nitro-2-furyl)-4-benzyl-1,2,4-oxadiazol-5-one, M.P. 148–150° after crystallization from acetone.

The following additional compounds are obtained by the above procedure:

3 - (5 - nitro - 2 - furyl) - 4 - ethyl - 1,2,4 - oxadiazol-5-one, M.P. 107–109°.

3 - (5 - nitro - 2 - furyl) - 4 - (β-hydroxyethyl) - 1,2,4-oxadiazol-5-one, M.P. 124–126°.

What is claimed is:
1. A compound of the formula

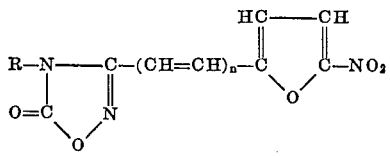

wherein $n$ is 0 or 1, R is hydrogen, lower alkyl, phenyl-lower alkyl, hydroxy-lower alkyl, halo-lower alkyl, lower alkanoyl or phenyl-lower alkanoyl, and alkali salts of those compounds wherein R is hydrogen.

2. A compound according to claim 1 wherein R is hydrogen.

3. A compound according to claim 1 wherein R is hydrogen and $n$ is 0.

4. A compound according to claim 1 wherein R is hydrogen and $n$ is 1.

5. A compound according to claim 1 wherein R is lower alkyl.

6. A compound according to claim 1 wherein R is phenyl-lower alkyl.

7. A compound according to claim 1 wherein R is hydroxy-lower alkyl.

8. A compound according to claim 1 wherein R is methyl and $n$ is 0.

9. A compound according to claim 1 wherein R is methyl and $n$ is 1.

10. A compound according to claim 1 wherein R is benzyl and $n$ is 1.

References Cited

UNITED STATES PATENTS 3,146,232   8/1964   Saikachi et al. _____ 260—240
3,336,304   8/1967   Nakano et al. _____ 260—240

OTHER REFERENCES

Chemical Abstracts, vol. 62, cols. 4024 to 4025 (1965), (abstract of Eloy).

Chemical Abstracts, vol. 62, cols. 5269 to 5270 (1965), (abstract of Sherman et al.).

JOHN D. RANDOLPH, Primary Examiner

U.S. Cl. X.R.

260—307, 999